United States Patent
Bouscaren

(10) Patent No.: US 11,009,371 B2
(45) Date of Patent: May 18, 2021

(54) METHOD FOR AUTOMATICALLY CALIBRATING A CAMSHAFT SENSOR IN ORDER TO CORRECT A GAP JUMP

(71) Applicants: Continental Automotive France, Toulouse (FR); Continental Automotive GmbH, Hannover (DE)

(72) Inventor: Denis Bouscaren, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 17/043,989

(22) PCT Filed: Mar. 28, 2019

(86) PCT No.: PCT/FR2019/050721
§ 371 (c)(1),
(2) Date: Sep. 30, 2020

(87) PCT Pub. No.: WO2019/193270
PCT Pub. Date: Oct. 10, 2019

(65) Prior Publication Data
US 2021/0033428 A1 Feb. 4, 2021

(30) Foreign Application Priority Data
Apr. 5, 2018 (FR) .................................... 1852953

(51) Int. Cl.
*G01C 17/38* (2006.01)
*G01D 5/244* (2006.01)
*F01L 1/047* (2006.01)

(52) U.S. Cl.
CPC .......... *G01D 5/24452* (2013.01); *F01L 1/047* (2013.01); *G01D 5/2448* (2013.01); *F01L 2820/041* (2013.01)

(58) Field of Classification Search
CPC .................................................. G01D 5/24452
(Continued)

(56) References Cited

U.S. PATENT DOCUMENTS 9,702,786 B2 * 7/2017 Zouboff ............. G01M 15/046
2005/0073297 A1 4/2005 Walter et al.
(Continued)

FOREIGN PATENT DOCUMENTS

| FR | 2860587 A1 | 4/2005 |
|----|------------|--------|
| FR | 2985035 A1 | 6/2013 |
| WO | 2017045747 A1 | 3/2017 |

OTHER PUBLICATIONS

International Search Report and Written Opinion for International Application No. PCT/FR2019/050721, dated Jun. 21, 2019, with partial translation, 8 pages.
(Continued)

*Primary Examiner* — Aditya S Bhat
(74) *Attorney, Agent, or Firm* — RatnerPrestia

(57) ABSTRACT

A method for automatic calibration of a camshaft sensor for a motor vehicle. The sensor includes a processing module configured to generate, from a raw signal indicative of the variations in a magnetic field which are caused by the rotation of a toothed target and measured by a cell, an output signal indicative of the moments at which the teeth pass past the cell. The calibration method makes it possible, for each tooth, to determine a switching threshold not only as a function of a local minimum and of a local maximum for the tooth during the preceding revolution of the target, but also as a function of a corrective value calculated from a local maximum and/or a local minimum of the raw signal during the passage of a preceding tooth past the cell during a new revolution.

11 Claims, 5 Drawing Sheets

(58) Field of Classification Search
USPC .......................................................... 702/94
See application file for complete search history.

(56) References Cited

U.S. PATENT DOCUMENTS

2014/0195186 A1* 7/2014 Carbonne ............ G01R 33/093
702/94
2018/0259365 A1 9/2018 Mirassou et al.

OTHER PUBLICATIONS

International Search Report and Written Opinion for International Application No. PCT/FR2019/050721, dated Jun. 21, 2019, 12 pages (French).
English Translation of Written Opinion for International Application No. PCT/FR2019/050721, dated Jun. 21, 2019, 5 pages.

* cited by examiner

METHOD FOR AUTOMATICALLY CALIBRATING A CAMSHAFT SENSOR IN ORDER TO CORRECT A GAP JUMP

CROSS REFERENCE TO RELATED APPLICATIONS

This application is the U.S. National Phase Application of PCT International Application No. PCT/FR2019/050721, filed Mar. 28, 2019, which claims priority to French Patent Application No. 1852953, filed Apr. 5, 2018, the contents of such applications being incorporated by reference herein.

FIELD OF THE INVENTION

The present invention relates to the field of sensors for motor vehicles. In particular, the invention relates to a method for automatically calibrating a motor vehicle camshaft sensor.

BACKGROUND OF THE INVENTION

A camshaft sensor is, for example, used in a motor vehicle to determine which stroke of the combustion cycle is taking place in a cylinder of the engine (admission stroke, compression stroke, combustion stroke, or exhaust stroke). Such information for example allows a computer to determine at what moment and into what cylinder fuel is to be injected.

A camshaft sensor generally comprises a target (for example a metal disk, the periphery of which is toothed), a magnetic-field generator (for example a permanent magnet), a magnetic-field measurement cell (for example a Hall-effect cell or a magneto-resistive cell) and an electronic signal-processing module.

The teeth of the target are generally all of the same height, but may have spacings (spaces) and lengths that are not all identical, so as to code the angular position of the target.

Thus, the rotation of the target and the passing of the various teeth past the magnetic-field generator will generate variations in the magnetic field measured by the measurement cell, which variations can be analyzed in order to recognize the various teeth of the target and to decode the angular position of the target and, ultimately, the angular position of the camshaft rigidly connected to the target.

The measurement cell supplies the processing module with a raw signal indicative of the intensity of the magnetic field measured. The processing module then generates, from this raw signal, an output signal indicative of the moment at which the various teeth of the target pass past the measurement cell.

This output signal is, for example, an electrical signal comprising a succession of square waveforms. The high part of each square form corresponds to the passage of a tooth past the measurement cell. The low part of each square form corresponds to the passage of a space past the measurement cell. Each high part of a square form comprises a rising front and a falling front corresponding more or less to the passing of the mechanical fronts of the tooth past the measurement cell.

In general, each rising and falling front of the output signal (namely each transition of the electrical signal) is determined from a switching threshold that is predefined for the raw signal. In other words, the output signal exhibits a rising front when the raw signal passes above the switching threshold, and the output signal exhibits a falling front when the raw signal passes below the switching threshold. Conventionally, a switching threshold corresponding to approximately 75% of the amplitude of the raw signal is used (what is meant by the "amplitude of the raw signal" is the difference between a maximum value and a minimum value observed for said raw signal).

It is possible, for example, to define a fixed switching threshold which does not change value during operation of the sensor. However, such a solution is particularly imprecise insofar as the minimum and maximum values of the raw signal may change significantly during the operation of the sensor, notably as a function of temperature.

It is therefore known practice in the prior art to update the value of the switching threshold for each new revolution of the target, as a function of the minimum and maximum values of the raw signal which are observed during said revolution of the target. The updated value of the switching threshold is then used for the next revolution of the target. Such a solution improves the precision of the sensor.

However, the precision of the sensor is generally also impacted by deficiencies in the geometry of the target (for example if the teeth do not all have exactly the same height). The consequence of such deficiencies is that the magnitude of the gap between the measurement cell and a tooth of the target is not the same for each tooth. The raw signal then adopts different maximum and minimum values for each tooth, and a switching threshold that is defined as optimal for one of the teeth may prove to be entirely inappropriate for another tooth.

It is therefore known practice in the prior art to determine a different switching threshold for each tooth of the target. Each switching threshold for each tooth of the target may be updated for each new revolution of the target in order to be used for the next revolution of the target. Such a solution improves the precision of the sensor still further.

Nevertheless, the various solutions of the prior art are not always able to achieve the precision required by certain motor vehicle manufacturers for a camshaft sensor.

SUMMARY OF THE INVENTION

It is an aim of the present invention to overcome all or some of the disadvantages of the prior art, notably those set out hereinabove, by proposing a method for the automatic calibration of a camshaft sensor that allows the value of a switching threshold to be adjusted directly during a current revolution in accordance with observations made in respect of the preceding teeth that have already passed past the measurement cell during this same current revolution.

To this end, and according to a first aspect, the present invention proposes a method for the automatic calibration of a camshaft sensor for a motor vehicle engine. The sensor comprises:

a toothed target comprising at least two teeth,
a measurement cell configured to supply a raw signal indicative of the variations in a magnetic field which are induced by a rotation of the target, and
a processing module configured to supply, from the raw signal, an output signal indicative of the moments at which the teeth of the target pass past the cell.

The calibration method comprises, for each new revolution of the target and for each tooth:

determining a local minimum of the raw signal as a space preceding said tooth passes past the cell,
determining a local maximum of the raw signal as said tooth passes past the cell,
calculating a switching threshold for generating the output signal as a function of a local minimum and of a local maximum which are determined for said tooth in the preceding revolution of the target.

The calibration method is notable in that the switching threshold is also calculated as a function of a corrective value calculated as a function of a local maximum of the raw signal determined during the passage of a preceding tooth past the cell during the new revolution, and of a local maximum of the raw signal determined during the passage of said preceding tooth past the cell during a preceding revolution.

Thus, the calibration method makes it possible to determine, for a new current revolution and for a given tooth of the target, the value of a switching threshold not only as a function of a local minimum and of a local maximum which are detected for said tooth during the preceding revolution, but also as a function of a corrective value calculated from a local maximum and/or a local minimum of the raw signal during the passage of a preceding tooth past the cell during the current revolution.

Such measures notably make it possible to adjust the value of a switching threshold directly during the current revolution when unexpected variations in the raw signal are observed for preceding teeth which have already passed past the measurement cell during the current revolution.

Thus, there is no need to wait for a complete calibration revolution in order for these unexpected variations to be taken into account. Such unexpected variations may, for example, arise as a result of a change in the position of the target relative to the measurement cell, for example following a knock or significant vibrations (this is then referred to as a "jump in gap distance").

In particular modes of implementation, the invention may furthermore include one or more of the following features, taken alone or in any technically feasible combination.

In particular implementations, said corrective value corresponds to a difference between the local maximum determined for said preceding tooth in the preceding revolution and the local maximum determined for said preceding tooth in the new revolution.

In particular implementations, said corrective value corresponds to a difference between an amplitude of the raw signal for said preceding tooth in the preceding revolution and an amplitude of the raw signal for said preceding tooth in the new revolution. What is meant by "an amplitude for a tooth in a given revolution" is a difference between a local maximum and a local minimum which are determined for that tooth during the revolution concerned.

In particular implementations, said switching threshold is calculated as a function of said corrective value only if the corrective value is above or equal to a predetermined correction threshold.

In particular implementations, a correction threshold is defined for each tooth and for each revolution of the target, and a correction threshold for said preceding tooth in the new revolution of the target is defined by:

$$\Delta S_{k,N} = (1-K) \times (M_{k,N-1} - m_{k,N-1})$$

where:
$M_{k,N-1}$ corresponds to the value of the local maximum determined for said preceding tooth in the preceding revolution,
$m_{k,N-1}$ corresponds to the value of the local minimum for said preceding tooth in the preceding revolution,
K is a predefined factor comprised between 0 and 1.

In particular implementations, said switching threshold is calculated according to:

$$S_{j,N} = K \times (M_{j,N-1} - m_{j,N-1} - \Delta_{k,N}) + m_{j,N-1}$$

where:
$M_{j,N-1}$ corresponds to the value of the local maximum determined for said tooth in the preceding revolution,
$m_{j,N-1}$ corresponds to the value of the local minimum determined for said tooth in the preceding revolution,
$\Delta_{k,N}$ corresponds to the corrective value calculated for said preceding tooth in the new revolution.

In particular embodiments, the factor K is comprised between 0.7 and 0.8.

According to a second aspect, the present invention relates to a camshaft sensor for a motor vehicle engine. The sensor comprises:
a toothed target comprising at least two teeth,
a measurement cell configured to supply a raw signal indicative of the variations in a magnetic field which are induced by the rotation of the target, and
a processing module configured to supply, from said raw signal, an output signal indicative of the moments at which the teeth of the target pass past the cell.

The processing module is configured, for each new revolution of the target and for each tooth, to:
determine a local minimum of the raw signal as a space preceding said tooth passes past the cell,
determine a local maximum of the raw signal as said tooth passes past the cell,
calculate a switching threshold for generating the output signal as a function of a local minimum and of a local maximum which are determined for said tooth in the preceding revolution of the target.

The processing module is also configured to calculate the switching threshold as a function of a corrective value calculated as a function of a local maximum of the raw signal determined during the passage of a preceding tooth past the cell during the new revolution, and of a local maximum of the raw signal determined during the passage of said preceding tooth past the cell during a preceding revolution.

In particular embodiments, said corrective value corresponds to a difference between the local maximum determined for said preceding tooth in the preceding revolution and the local maximum determined for said preceding tooth in the new revolution.

According to a third aspect, the present invention relates to a motor vehicle comprising a camshaft sensor according to any one of the above embodiments.

BRIEF DESCRIPTION OF THE DRAWINGS

The invention will be better understood upon reading the following description, given by way of entirely non-limiting example and with reference to FIGS. 1 to 5, in which.

In these figures, references that are identical from one figure to the next denote identical or analogous elements.

For the sake of clarity, the elements that are shown are not necessarily to the same scale, unless stated otherwise.

DETAILED DESCRIPTION OF THE PREFERRED EMBODIMENTS

As indicated previously, the present invention seeks to improve the precision of a motor vehicle engine camshaft sensor.

Figure 1:
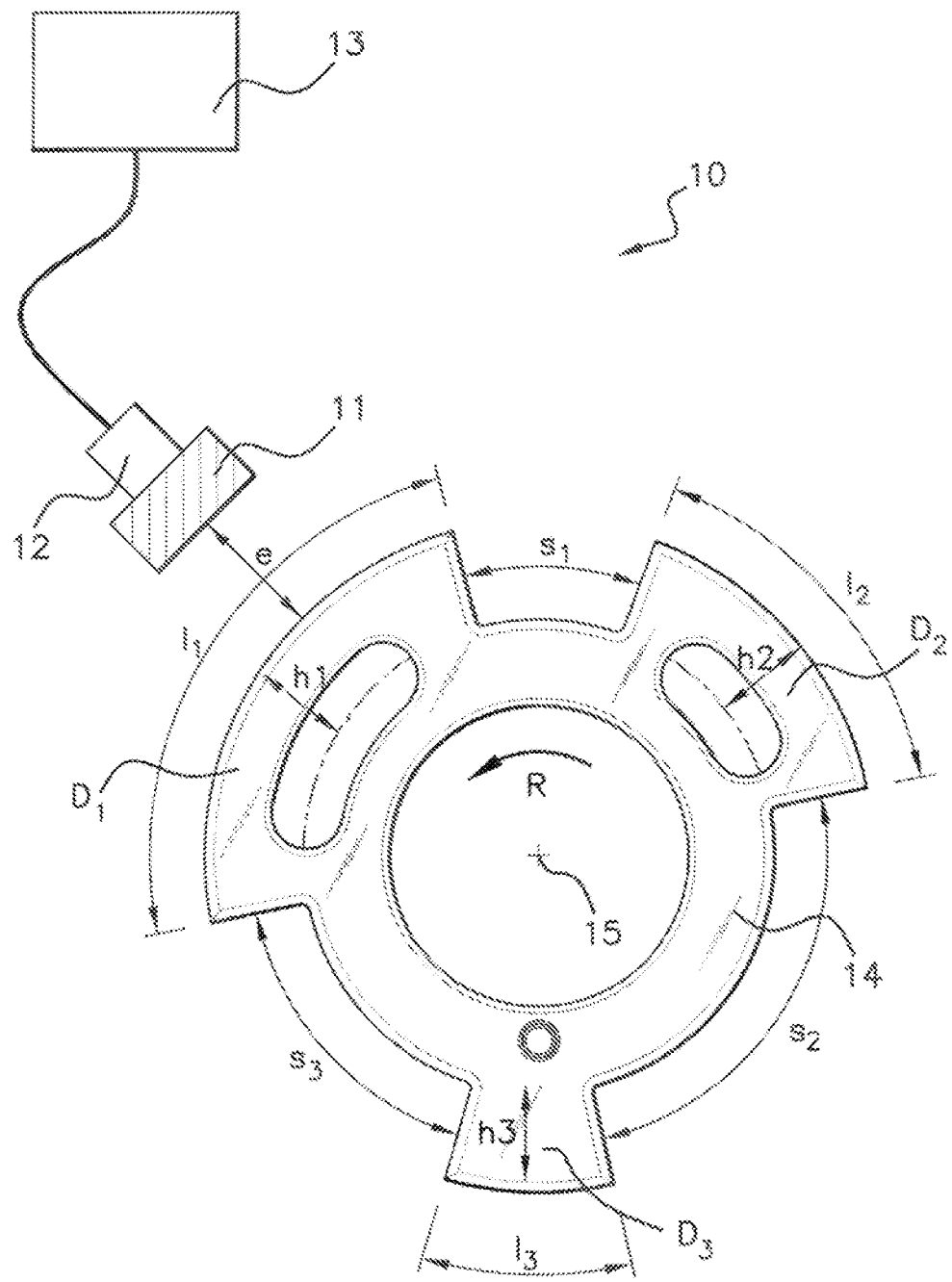
FIG. 1: is a schematic depiction of a camshaft sensor.

FIG. 1 schematically depicts one example of a camshaft sensor 10. This sensor 10 comprises a target 14, a magnetic-field generator 11, a measurement cell 12, and an electronic signal-processing module 13.

In one example considered and described entirely non-limitingly, the target 14 consists of a metal disk the periphery of which is toothed, the magnetic-field generator 11 is a permanent magnet, and the cell 12 for measuring the magnetic field is a Hall-effect cell. As illustrated in FIG. 1, the measurement cell 12 is positioned at the level of the magnetic-field generator 11.

It should be noted that, according to another example, the magnetic field measured by the measurement cell may be formed by the target itself, which, as appropriate, is made of a magnetic material. In such an instance, the target is "magnetically" toothed, which means to say that the geometry of the periphery of the target exhibits an alternation of North poles (equivalent to the teeth in the example of FIG. 1) and south poles (equivalent to the spaces in the example of FIG. 1).

The target 14 is fixed to a camshaft spindle in such a way that the disk of the target 14 and the camshaft spindle are coaxial. In other words, in an ideal situation, namely in the absence of any lack of precision in the mounting of the target 14 on the camshaft, the axis of the camshaft spindle and the axis of the target 14 coincide, and both pass through the center 15 of the target 14.

The teeth D1, D2, D3 of the target 14 have respective lengths I1, I2 and I3, and are separated from one another by spaces of respective lengths s1, s2 and s3. In order to code for the angular position of the target, the lengths I1, I2, I3, s1, s2, s3 of the teeth D1, D2, D3 and of the spaces are not all identical. The teeth D1, D2, D3 generally all have the same height, but deficiencies in the manufacturing of the target 14 may nevertheless cause slightly different values to be observed for the respective heights h1, h2, h3 of the teeth D1, D2, D3.

It should be noted that, in the example considered, the target 14 comprises three teeth D1, D2, D3, but the invention also applies to sensors 10 of which the target 14 comprises a different number of teeth. In particular, the invention is applicable to a target 14 comprising two or more teeth.

The rotation R of the target 14 and the successive passage of the various teeth D1, D2, D3 past the magnetic-field generator 11 lead to variations in the magnetic field measured by the cell 12. In effect, the magnetic field varies as a function of the magnitude of the gap e separating the magnetic-field generator 11 and the target 14.

The measurement cell 12 supplies the processing module 13 with a raw signal indicative of the strength of the magnetic field measured. The processing module 13 is, for example, configured to generate, from this raw signal, an output signal indicative of the moments at which the various teeth D1, D2, D3 of the target 14 pass past the measurement cell 12. The output signal may then make it possible to recognize the moments at which the various teeth D1, D2, D3 of the target 14 pass past the measurement cell 12 and, ultimately, the angular position of the camshaft secured to the target.

In order to do that, the processing module 13 comprises for example one or more processors and storage means (electronic memory) in which a computer program product is stored, in the form of a set of program code instructions to be executed in order to implement the various steps needed for generating said output signal from the raw signal. Alternatively or in addition, the processing module 13 comprises programmable logic circuits of FPGA, PLD, etc. type, and/or specialized integrated circuits (ASIC), and/or discrete electronic components, etc., suitable for implementing these steps. In other words, the processing module 13 comprises means configured by software and/or by hardware to implement the operations necessary for generating said output signal from the raw signal.

FIG. 2A schematically depicts a portion of a raw signal 20 indicative of the variations in the magnetic field measured by the cell 12. The strength B of the magnetic field is represented on the ordinate axis while the time t is represented on the abscissa axis.

The portion of the raw signal 20 depicted in FIG. 2A corresponds for example to a passage of a tooth $D_j$ of index j past the measurement cell 12 during a revolution N of the target 14.

In the example considered, the target 14 comprises three teeth D1, D2, D3, and the index j therefore varies between 1 and 3. The number N corresponds for example to the number of complete revolutions performed by the target 14 since an initialization of the sensor 10 corresponding, for example, to an application of power to the processing module 13.

The raw signal 20 thus exhibits a high part with a rising front 21 corresponding to the start of the passage of the tooth $D_j$ past the cell 12, and a falling front 22 corresponding to the end of the passage of the tooth $D_j$ past the cell 12. The rising front corresponds to a sharp increase in the magnetic field strength caused by the sharp decrease in the magnitude of the gap e as the tooth $D_j$ begins to pass past the cell 12 (the transition from a space to a tooth). The falling front corresponds to a sharp decrease in the magnetic field strength caused by the sharp increase in the magnitude of the gap e as the tooth $D_j$ completes its passage past the cell 12 (the transition from a tooth to a space). Between the rising front 21 and the falling front 22, the signal 20 adopts a value that is more or less constant assuming that the magnitude of the gap remains substantially identical throughout the time taken for the tooth $D_j$ to pass past the cell 12.

FIG. 2B schematically depicts a portion of an output signal 30 generated by the processing module 13 from the raw signal 20.

This output signal 30 is for example an electrical signal adopting a positive value (for example 5V) when a tooth D1, D2, D3 is facing the cell 12, and a zero value (0V) when a space is facing the cell 12. The electrical voltage V of the output signal 30 is represented on the ordinate axis and the time t is represented on the abscissa axis.

The output signal 30 thus comprises a succession of square waveforms. The high part of each square form corresponds to the passage of a tooth D1, D2, D3 of the target 14 past the measurement cell 12. The high part of each square form comprises a rising front 31 and a falling front 32 corresponding more or less to the passing of the mechanical fronts of a tooth D1, D2, D3 past the measurement cell.

The portion of the raw signal 30 depicted in FIG. 2B corresponds for example to a passage of the tooth $D_j$ past the cell 12.

In general, the moment of each rising front 31 and falling front 32 of the output signal 30 (namely each transition of the electrical signal) is determined, for the tooth $D_j$ in the revolution N of the target 14, from a switching threshold $S_{j,N}$ that is predetermined for the raw signal 20. In other words, the output signal 30 exhibits a rising front 31 when the raw signal 20 passes above the switching threshold $S_{j,N}$, and the output signal 30 exhibits a falling front 32 when the raw signal 20 passes below the switching threshold $S_{j,N}$.

On each revolution N of the target 14, the processing module 13 is able to determine and store in memory a local maximum $M_{j,N}$ and a local minimum $m_{j,N}$ which are observed on the raw signal 20 for the tooth $D_j$. From that it is then possible to deduce an amplitude $A_{j,N}$ of the raw signal 20 for the tooth $D_j$ in the revolution N, as being equal to the difference between $M_{j,N}$ and $m_{j,N}$.

The switching threshold $S_{j,N}$ is for example calculated from a percentage of the amplitude $A_{j,N}$ of the raw signal 20 for the tooth $D_j$ during the preceding revolution N−1 of the target 14. The threshold $S_{j,N}$ conventionally corresponds to a value chosen from a range comprised between 70% and 80% of the amplitude $A_{j,N-1}$, preferably around 75%. In other words, for a factor K comprised between 0 and 1, generally comprised between 0.7 and 0.8, and preferentially amounting to 0.75, the threshold $S_{j,N}$ is conventionally defined by:

$$S_{j,N} = m_{j,N-1} + A_{j,N-1} \times K \qquad (1)$$

The remainder of the description, considers, by way of nonlimiting example, the case in which K=75%.

Figure 2:
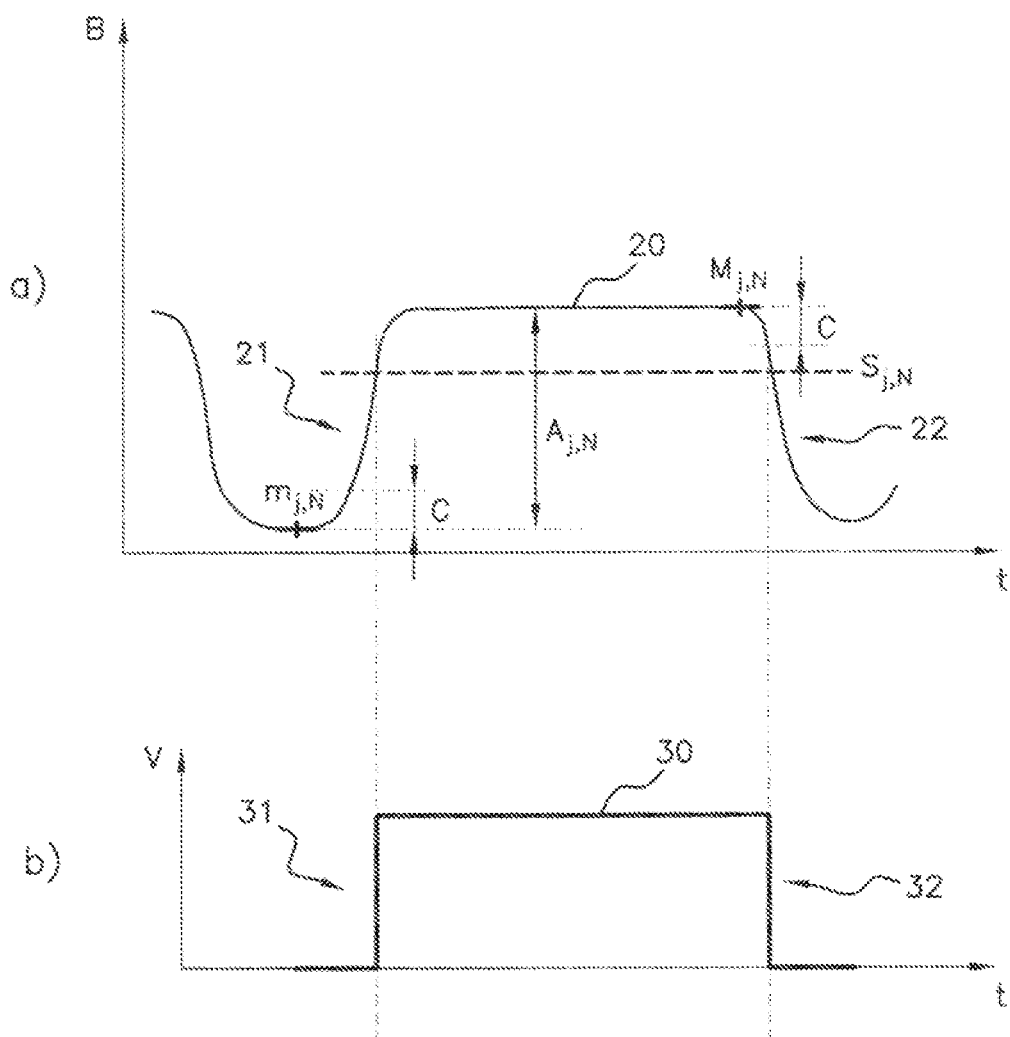
FIGS. 2A-2B: are schematic depictions, for one tooth of the target, of a raw signal indicative of the variations in magnetic field which are induced by the rotation of the target of the sensor, and of an associated output signal.

It is known practice, as illustrated by way of example in part a) of FIG. 2, to detect a local minimum $m_{j,N}$ (or, respectively, the local maximum $M_{j,N}$) for the tooth $D_j$ in the revolution N of the target 14 when the raw signal 20 varies by a value that is greater (in terms of absolute value) than a predefined constant C after its gradient has become positive (or, respectively, negative).

This can be repeated for each revolution of the target 14 and for each tooth D1, D2, D3 of the target 14 so as to obtain, for a revolution N of the target 14, a value $S_{j,N}$ for the switching threshold to be used. This may be the one same switching threshold $S_N$ to be used for all the teeth D1, D2, D3 (the value of this threshold being calculated for example as a function of a mean, minimum or maximum value of the local minima $m_{j,N-1}$ and/or of the local maxima $M_{j,N-1}$ observed for the teeth D1, D2, D3 in the preceding revolution N−1), or else it may be a switching threshold $S_{j,N}$ that is different for each tooth $D_j$ (the value of this threshold being calculated for example as a function of the local maximum $M_{j,N-1}$ and of the local minimum $m_{j,N-1}$ which are observed for the tooth $D_j$ in the preceding revolution N−1).

It may be advantageous to determine a switching threshold $S_{j,N}$ that is different for each tooth $D_j$, particularly if deficiencies with the geometry of the target 14 or a phenomenon of runout (misalignment of the axis of the target 14 with that of the camshaft) are leading to local maxima values that differ for the various teeth of the target.

It should also be noted that it is conceivable for the switching threshold $S_{j,N}$ not to be recalculated for each new revolution of the target but, for example, updated less frequently than the frequency of rotation of the target 14, for example each time the target 14 has performed a predetermined number of revolutions. Nevertheless, it is advantageous for the switching threshold $S_{j,N}$ to be recalculated regularly, and preferably for each revolution of the target 14, in order to compensate for variations in the raw signal 20 during the course of operation of the sensor (for example as a result of variations in temperature).

Figure 3:
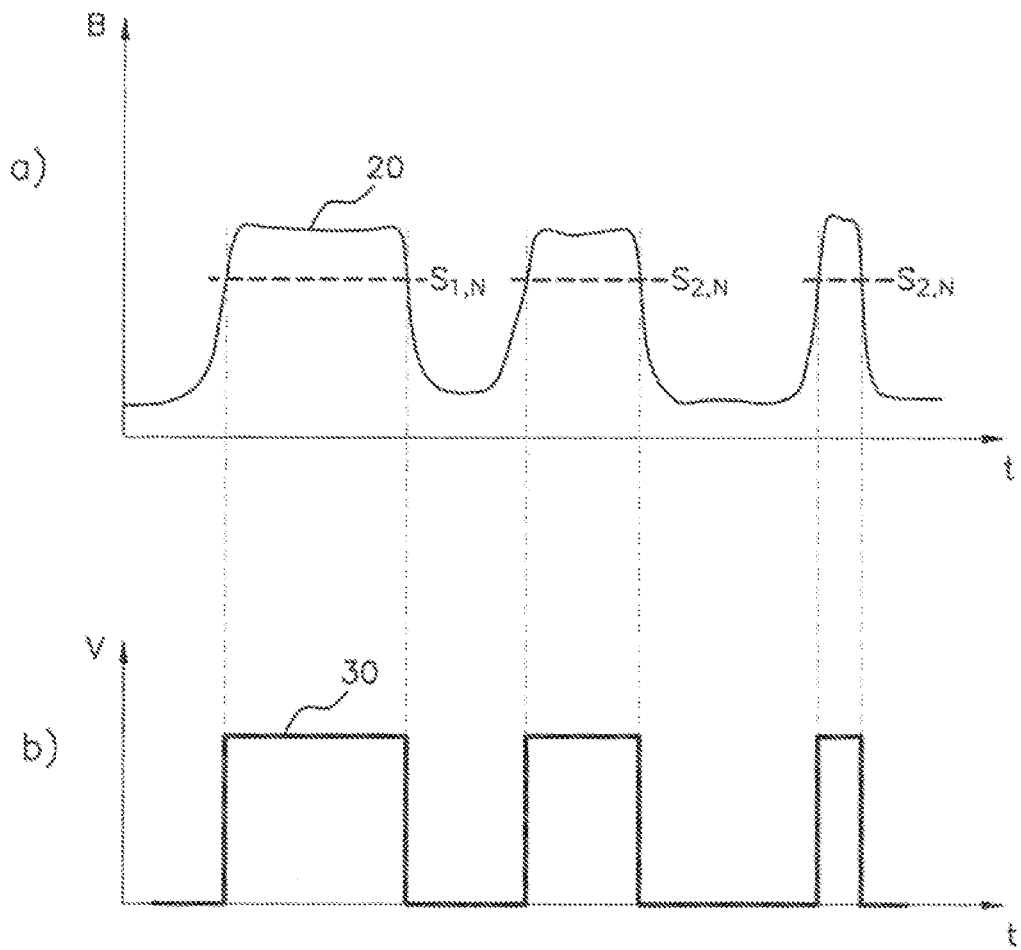
FIGS. 3A-3B: are schematic depictions of the raw signal and of the corresponding output signal for one complete revolution of the target.

FIG. 3A schematically depicts the way in which the raw signal 20 evolves during a revolution N of the target 14. Three high parts succeed one another, these corresponding respectively to the passage of the three teeth D1, D2, D3 of the target 14 past the measurement cell 12. FIG. 3B for its part schematically depicts the evolution of the output signal 30 generated from the raw signal 20 and from the thresholds $S_{1,N}$, $S_{2,N}$, $S_{3,N}$ calculated for the teeth D1, D2, D3 according to one of the solutions described earlier.

It proves to be the case that, in certain operating scenarios, these solutions do not allow the camshaft sensor 10 to achieve sufficient precision. The inventor has notably discovered that a change in the position of the target 14 relative to the measurement cell 12 can occur, for example as the result of vibrations or knocks. That has the effect of moving the teeth D1, D2, D3 closer to or further away from the measurement cell 12, namely of reducing or increasing the magnitude of the gap e separating a tooth D1, D2, D3 from the target 14 as it passes past the measurement cell 12. A variation in the magnitude of the gap e leads to a variation in the magnetic field measured by the measurement cell 12.

In the remainder of the description, such a sudden variation in the magnitude of the gap separating a tooth D1, D2, D3 from the measurement cell 12 is referred to as a "jump in gp distance".

Figure 4:
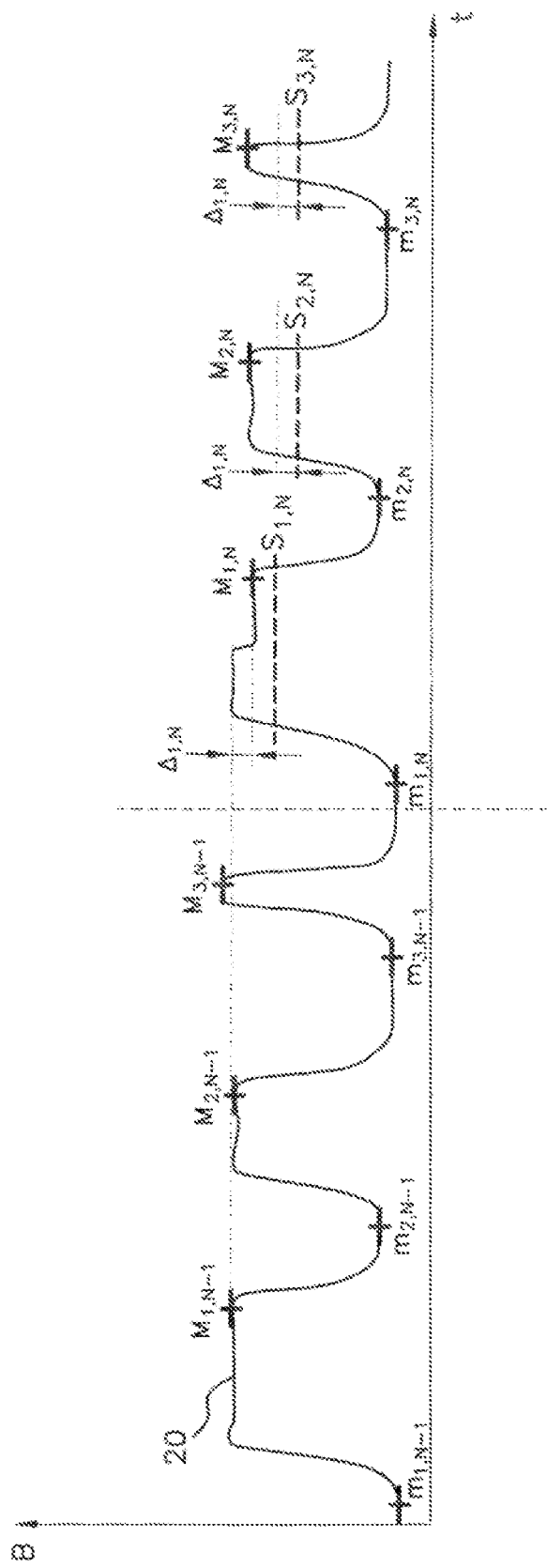
FIG. 4: is a schematic depiction of the raw signal and of the output signal for two consecutive revolutions of the target, with a jump in gap distance on the second revolution.

FIG. 4 schematically depicts the effect of a jump in gap distance on the raw signal 20.

FIG. 4 depicts the way in which the raw signal 20 evolves during two revolutions of the target 14. From left to right, the first three high parts of the raw signal 20 correspond respectively to the passage of the teeth D1, D2, D3 past the measurement cell 12 during one revolution N−1, then the next three high parts correspond respectively to the passage of the teeth D1, D2, D3 past the measurement cell 12 during the next revolution N.

In the example illustrated in FIG. 4, a jump in gap distance occurs as the tooth D1 passes past the measurement cell 12 during the revolution N. It is notably possible to observe a sudden drop in the raw signal 20 at a moment corresponding more or less to the middle of the passage of the tooth D1 past the measurement cell 12. This sudden drop in the raw signal 20 in the middle of the passage of the tooth D1 past the measurement cell 12 is caused by a jump in gap distance which moves the target 14 (and therefore the teeth D1, D2, D3) away from the measurement cell 12.

While the switching threshold $S_{1,N}$ calculated for example in accordance with formula (1) remains suitable for determining the moment of the rising front 31 of the output signal 30 representing the start of the passage of the tooth D1 past the measurement cell 12 in the revolution N, it is, by contrast, entirely ill-suited to determining the moment of the falling front 32 of the output signal 30 indicative of the end of the passage of the tooth D1 past the measurement cell 12 in the revolution N. Specifically, because of the jump in gap distance that has occurred in the middle of the passage of the tooth D1 past the measurement cell 12, the switching threshold $S_{1,N}$ now no longer corresponds to 75% of the amplitude of the raw signal 20 observed at the end of the passage of the tooth D1 past the measurement cell 12. Therefore, the moment of the falling front of the output signal 30 corresponding to the passage of the mechanical front of the tooth D1 past the measurement cell 12 at the end of the passage of the tooth D1 is detected too early, and the precision of the sensor 10 is impaired. If nothing is done about this, similar precision errors will impact on the following teeth D2 and D3 during revolution N.

The remainder of the description concerns itself with describing a method for calibrating the camshaft sensor 10 that makes it possible to correct the switching thresholds $S_{2,N}$ and $S_{3,N}$ for the teeth D2 and D3 which pass past the measurement cell 12 after the tooth D1 during revolution N.

Thus, where conventionally it was necessary to wait for the target 14 to perform at least one full revolution after a jump in gap distance in order to find switching-threshold values suited to the actual values of the raw signal 20, the method according to the invention allows the switching thresholds to be used for the teeth that follow the tooth for which the jump in gap distance was detected to be corrected directly during the current revolution. The precision of the sensor 10 is thus improved.

It should be noted that, in the example considered and illustrated in FIG. 4, the jump in gap distance has a negligible impact on the values adopted by the raw signal 20 when the spaces pass past the measurement cell 12. In particular, the values of the local minima $m_{j,N}$ observed during revolution N are substantially identical to those of the local minima $m_{j,N-1}$ observed during revolution N−1. Indeed experience shows that a jump in gap distance does not generally change the magnitude of the magnetic field measured by the cell 12 in the presence of a space, as in any case at that moment the magnetic field is at a low value equivalent to that which would be measured in the complete absence of a metallic target 14.

Before applying a switching threshold $S_{j,N}$ as calculated according to formula (1) for a tooth $D_j$ on a revolution N of the target 14, the method according to the invention also determines, for said tooth $D_j$, whether a corrective value $\Delta_{k,N}$ needs to be applied to said switching threshold $S_{j,N}$. The corrective value $\Delta_{k,N}$ is calculated as a function of observations made on a preceding tooth $D_k$ during the same revolution (0<k<j).

For example, if it is found, for a tooth $D_k$ that the local maximum $M_{k,N}$ observed for the tooth $D_k$ during revolution N differs from the local maximum $M_{k,N-1}$ observed for the tooth $D_k$ during the preceding revolution N−1, then a corrective value $\Delta_{k,N}$ equal to this difference may be applied to the switching threshold $S_{j,N}$.

In particular implementations, the corrective value $\Delta_{k,N}$ is taken into consideration in calculating the switching threshold $S_{j,N}$ only if it is higher than or equal to a predetermined correction threshold $\Delta S$, this being so as to avoid unwarranted corrections caused by minor variations in the raw signal 20 from one revolution of the target 14 to another.

Figure 5:
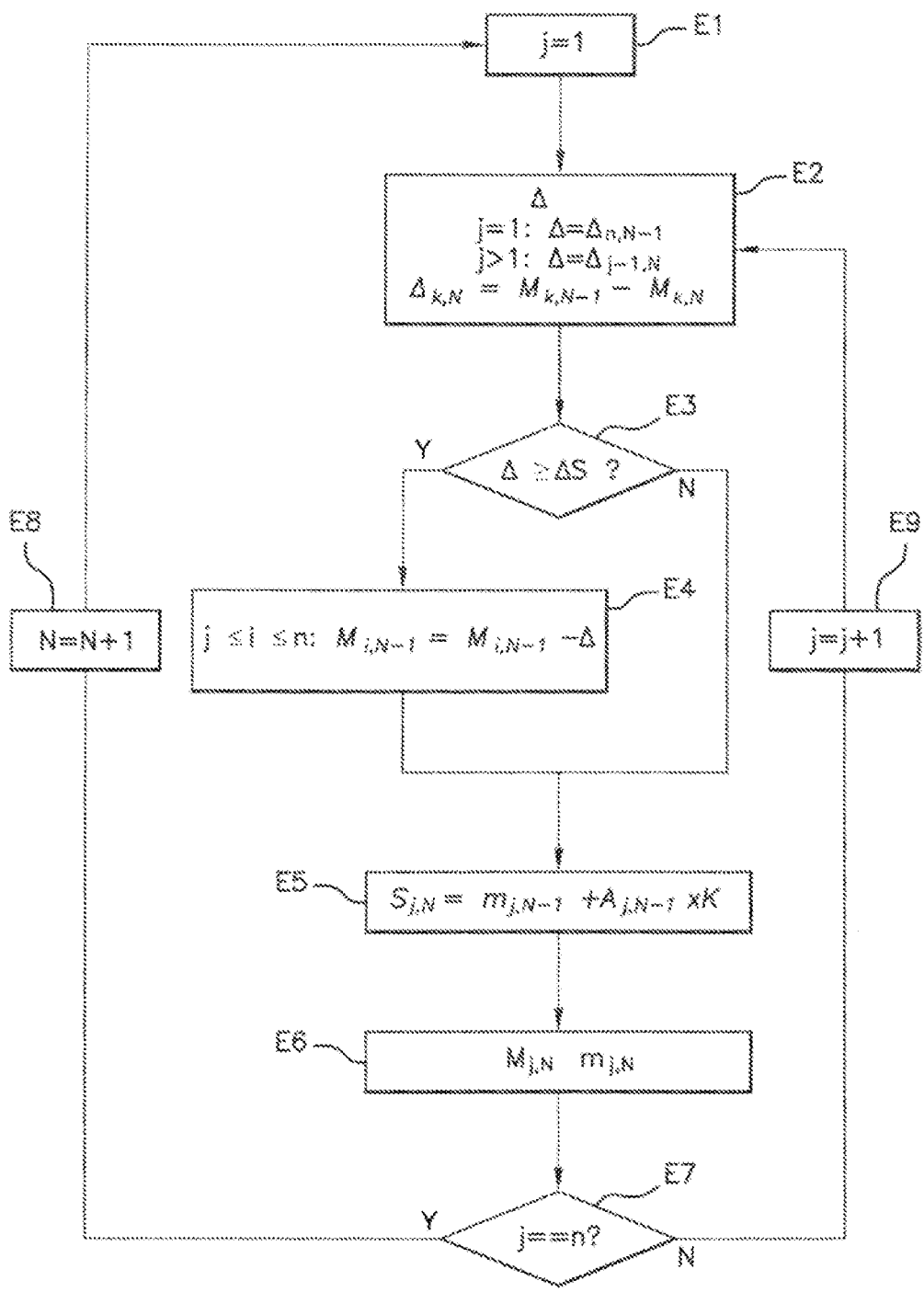
FIG. 5: shows one particular implementation of the automatic-calibration method according to the invention.

FIG. 5: shows the main steps of one particular implementation of the method according to the invention for automatically calibrating the sensor 10. Steps E1 to E9 illustrated in FIG. 5 are implemented during one revolution N of the target 14 and are repeated for each new revolution. In the example considered, the method is implemented by the processing module 13 of the sensor 10.

In an initialization step E1 for a revolution of rank N, a counter j indicating the index for the next tooth $D_j$ that is to pass past the measurement cell 12 is initialized to the value 1 (the teeth are numbered from 1 to n, n being the number of teeth of the target 14).

In a step E2, a corrective value $\Delta$ is calculated as a function of that which has been observed for the tooth $D_k$ situated just before the tooth $D_j$ on the target 14. If the index j is equal to 1, it is appropriate to pay attention to that which was observed for the last tooth $D_n$ in the previous revolution N−1. The corrective value is then denoted $\Delta_{n,N-1}$. If the index j is strictly greater than 1, it is appropriate to pay attention to that which was observed for the preceding tooth $D_{j-1}$ in revolution N. The corrective value is then denoted $\Delta_{j-1,N}$.

In the particular implementation being considered at the present moment, a corrective value $\Delta_{k,N}$ for a tooth $D_k$ in revolution N corresponds to the difference between a local maximum $M_{k,N-1}$ observed on the raw signal 20 as the tooth $D_k$ passes past the measurement cell 12 in revolution N−1 and a local maximum $M_{k,N}$ observed on the raw signal 20 when the tooth $D_k$ passes past the measurement cell 12 in revolution N:

$$\Delta_{k,N}=M_{k,N-1}-M_{k,N} \quad (2)$$

A step E3 checks whether the corrective value $\Delta$ calculated in step E2 is above a predetermined correction threshold $\Delta S$.

If the collective value $\Delta$ is above the correction threshold $\Delta S$, then in a step E4, the local maxima detected and stored during the previous revolution N−1 for the teeth $D_i$ which have not yet passed past the measurement cell 12 in the revolution N are adjusted with the corrective value $\Delta$:

$$\text{For } j \leq i \leq n: M_{i,N-1} M_{i,N-1} - \Delta$$

In a step E5, the switching threshold $S_{j,N}$ to be used for the tooth $D_j$ in revolution N can then be calculated using formula (1), it being understood that the corrective value $\Delta$ is incorporated into the calculation of $S_{j,N}$ through the adjustment of $M_{j,N-1}$ which has been performed in step E4.

In a step E6, the local minimum $m_{j,N}$ and the local maximum $M_{j,N}$ are detected then stored in memory in order to be used later.

A step E7 checks whether the tooth $D_j$ corresponds to the last tooth to pass past the measurement cell 12 for the revolution N. If it is, the revolution counter is incremented to the value N+1 (step E8) and the method resumes from step E1. If not, the tooth counter is incremented to the value j+1 (step E9) and the method resumes from step E2.

By applying the steps of the method described with reference to FIG. 5 to the example illustrated in FIG. 4, it will be appreciated that:

before the tooth D2 (j=2) passes past the measurement cell 12 in revolution N of the target 14, a corrective value $\Delta_{1,N}$ is calculated in step E2 as being the difference between the local maximum $M_{1,N-1}$ observed for the tooth D1 in revolution N−1 and the local maximum $M_{1,N}$ for the tooth D1 in revolution N, this corrective value $\Delta_{1,N}$ (which in the example being considered corresponds to a jump in gap distance) is higher than or equal to a predetermined correction threshold $\Delta S$, and therefore the local maxima $M_{2,N-1}$ and $M_{3,N-1}$ are adjusted in step E4, the threshold $S_{2,N}$ calculated in step E5 is thus corrected with respect to the jump in gap distance by virtue of the adjustment of the local maximum $M_{2,N-1}$ using the corrective value $\Delta_{1,N}$, for tooth D3 (j=3), the corrective value $\Delta_{2,N}$ is below the correction threshold $\Delta S$ insofar as the local maximum $M_{3,N-1}$ has already been adjusted beforehand using the corrective value $\Delta_{1,N}$ in order to correct for the effects of the jump in gap distance observed for tooth D1. The threshold $S_{3,N}$ is thus also corrected by the corrective value $\Delta_{1,N}$.

The calibration method has thus made it possible to correct the switching thresholds $S_{2,N}$ and $S_{3,N}$ for teeth D2 and D3 directly during revolution N, and there is no need to wait for a full revolution of the target 14 in order for the effects of the jump in gap distance to be corrected.

It should be noted that there are various conceivable methods for defining the corrective value $\Delta_{k,N}$.

For example, the corrective value $\Delta_{k,N}$ may correspond to the difference between an amplitude $A_{k,N-1}$ observed on the raw signal 20 as the tooth $D_k$ passes past the measurement cell 12 in revolution N−1 and an amplitude $A_{k,N}$ observed on the raw signal 20 when the tooth $D_k$ passes past the measurement cell 12 in revolution N:

$$\Delta_{k,N} = A_{k,N-1} - A_{k,N} = (M_{k,N-1} m_{k,N-1}) - (M_{k,N} - m_{k,N}) \quad (3)$$

Calculating a corrective value as a function of a difference in amplitude rather than a difference in local maximum may prove beneficial if the jump in gap distance has an impact not only on the local maximum but also on the local minimum.

According to another example, the corrective value $\Delta_{k,N}$ may be determined by comparing two successive teeth, rather than by comparing the same tooth on two consecutive revolutions.

It is however advantageous to determine the corrective value $\Delta_{k,N}$ by comparing the same tooth on two consecutive revolutions, notably if deficiencies with the geometry of the target 14 or a phenomenon of runout lead to different local maxima values for the various teeth of the target (in which case a comparison between two successive teeth is not necessarily relevant).

According to yet another example, the corrective value $\Delta_{k,N}$ may correspond to a difference between two local minima.

The particular choice made of a method for determining the corrective value $\Delta_{k,N}$ merely represents a variant of the invention.

Furthermore, it is equally possible to define a different correction threshold for each tooth of the target 14. For example, a correction threshold $\Delta S_{k,N}$ may thus be defined for each tooth $D_k$ and for each revolution N of the target, such that:

$$\Delta S_{k,N} = (1-K) \times (M_{k,N-1} - m_{k,N-1}) \quad (4)$$

Such a choice of correction threshold makes it possible to ensure that the detection of a tooth is not missed, while at the same time limiting instances in which a correction is made. Specifically, a higher correction threshold could lead to instances in which an uncorrected switching threshold is higher than a local maximum of the raw signal 20, and this would lead to a missed detection of a tooth. If, on the other hand, the correction threshold is too low, an excessive number of corrections could lead to suboptimal operation of the sensor 10.

It should be noted that steps E1 to E9 described with reference to FIG. 5 are valid for N>2, namely starting from a third revolution of the target 14 since the initialization of the sensor 10 upon application of power thereto. Specifically, during the first revolution of the target 14 (N=1), there are no local maxima and minima values stored in memory for a preceding revolution. Thus, during the second revolution of the target 14 (N=2), it is not possible to determine the corrective value $\Delta_{n,1}$ in order to potentially correct the threshold $S_{1,2}$. For the first two revolutions of the target 14, a set default value is for example used for the switching thresholds while awaiting the obtaining of the local maxima and minima values that will allow said switching thresholds to be calibrated more precisely.

The description above clearly illustrates that, through its various features and the advantages thereof, the present invention achieves the set aims. In particular, the calibration method according to the invention makes it possible to determine with greater precision the moments of a rising front 31 and of a falling front 32 of the output signal 30 corresponding respectively to the moments marking the beginning and end of the passage of the mechanical fronts of a tooth D1, D2, D3 as said tooth D1, D2, D3 passes past the measurement cell 12. In the event of a jump in gap distance, the calibration method is able to react directly and adjust the switching thresholds without the need to wait for a full calibration revolution in order for the effect of the jump in gap distance to be able to be accounted for.

The invention claimed is:

1. A method for automatic calibration of a camshaft sensor for a motor vehicle engine,
said sensor comprising:
a toothed target comprising at least two teeth (D1, D2, D3),
a measurement cell configured to supply a raw signal indicative of the variations in a magnetic field which are induced by a rotation (R) of the target, and
a processing module configured to supply, from the raw signal, an output signal indicative of moments at which the teeth (D1, D2, D3) of the target pass past the cell,
said method comprising, for each new revolution (N) of the target and for each tooth ($D_j$):
determining a local minimum ($m_{j,N}$) of the raw signal as a space preceding said tooth ($D_j$) passes past the cell,
determining a local maximum ($M_{j,N}$) of the raw signal as said tooth ($D_j$) passes past the cell,
calculating a switching threshold ($S_{j,N}$) for generating the output signal as a function of a local minimum ($m_{j,N-1}$) and of a local maximum ($M_{j,N}$) which are determined for said tooth ($D_j$) in a preceding revolution (N−1) of the target,
wherein the switching threshold ($S_{j,N}$) is also calculated as a function of a corrective value ($\Delta_{k,N}$) calculated as a function of a local maximum ($M_{k,N}$) of the raw signal determined during the passage of a preceding tooth ($D_k$) past the cell during the new revolution (N), and of a local maximum k ($M_{k,N-1}$) of the raw signal determined during the passage of said preceding tooth ($D_k$) past the cell during a preceding revolution (N−1).

2. The method as claimed in claim 1, wherein said corrective value ($\Delta_{k,N}$) corresponds to a difference between the local maximum ($M_{k,N-1}$) determined for said preceding tooth ($D_k$) in the preceding revolution (N−1) and the local maximum ($M_{k,N}$) determined for said preceding tooth ($D_k$) in the new revolution (N).

3. The method as claimed in claim 2, wherein said switching threshold ($S_{j,N}$) is calculated as a function of said corrective value ($\Delta_{k,N}$) only if the corrective value ($\Delta_{k,N}$) is above or equal to a predetermined correction threshold ($\Delta S$).

4. The method as claimed in claim 3, wherein a correction threshold is defined for each tooth (D1, D2, D3) and for each revolution of the target, and a correction threshold ($\Delta S_{k,N}$) for said preceding tooth ($D_k$) in the new revolution (N) of the target is defined by:

$$\Delta S_{k,N} = (1-K) \times (M_{k,N-1} - m_{k,N-1})$$

where:

$M_{k,N-1}$ corresponds to the value of the local maximum ($M_{k,N-1}$) determined for said preceding tooth ($D_k$) in the preceding revolution (N−1), $m_{k,N-1}$ corresponds to the value of the local minimum ($m_{k,N-1}$) for said preceding tooth ($D_k$) in the preceding revolution (N−1), K is a predefined factor comprised between 0 and 1.

5. The method as claimed in claim 4, wherein said switching threshold ($S_{j,N}$) is calculated according to:

$$S_{j,N}=K\times(M_{j,N-1}-m_{j,N-1}-\Delta_{k,N})+m_{j,N-1}$$

where:

$M_{j,N-1}$ corresponds to the value of the local maximum ($M_{j,N-1}$) determined for said tooth ($D_j$) in the preceding revolution (N−1), $m_{k,N-1}$ corresponds to the value of the local minimum ($m_{k,N-1}$) determined for said tooth ($D_j$) in the preceding revolution (N−1), $\Delta_{k,N}$ corresponds to the corrective value ($\Delta_{k,N}$) calculated for said preceding tooth ($D_k$) in the new revolution (N).

6. The method as claimed in claim 5, wherein K is comprised between 0.7 and 0.8.

7. The method as claimed in claim 1, wherein said corrective value ($\Delta_{k,N}$) corresponds to a difference between an amplitude ($A_{k,N-1}$) of the raw signal for said preceding tooth ($D_k$) in the preceding revolution (N−1) and an amplitude ($A_{k,N}$) of the raw signal for said preceding tooth ($D_k$) in the new revolution (N).

8. The method as claimed in claim 7, wherein said switching threshold is calculated as a function of said corrective value only if the corrective value is above or equal to a predetermined correction threshold.

9. A camshaft sensor for a motor vehicle engine, comprising:

a toothed target comprising at least two teeth (D1, D2, D3), a measurement cell configured to supply a raw signal indicative of the variations in a magnetic field which are induced by the rotation of the target, and a processing module configured to supply, from the raw signal, an output signal indicative of moments at which the teeth (D1, D1, D3) of the target pass past the cell, said processing module being configured, for each new revolution (N) of the target and for each tooth ($D_j$), to:

determine a local minimum ($m_{j,N}$) of the raw signal as a space preceding said tooth ($D_j$) passes past the cell, determine a local maximum ($M_{j,N}$) of the raw signal as the tooth ($D_j$) passes past the cell, calculate a switching threshold ($S_{j,N}$) for generating the output signal as a function of a local minimum ($m_{j,N-1}$) and of a local maximum ($M_{j,N-1}$) which are determined for said tooth ($D_j$) in a preceding revolution (N−1) of the target, wherein said processing module is also configured to calculate the switching threshold ($S_{j,N}$) as a function of a corrective value ($\Delta_{k,N}$) calculated as a function of a local maximum ($M_{k,N}$) of the raw signal during the passage of a preceding tooth ($D_k$) past the cell during the new revolution (N), and of a local maximum ($M_{k,N-1}$) during the passage of said preceding tooth ($D_k$) past the cell during a preceding revolution (N−1).

10. The sensor as claimed in claim 9, wherein said corrective value ($\Delta_{k,N}$) corresponds to a difference between a local maximum ($M_{k,N-1}$) determined for said preceding tooth ($D_k$) in the preceding revolution (N−1) and a local maximum ($M_{k,N}$) determined for said preceding tooth ($D_k$) in the new revolution (N).

11. A motor vehicle comprising a camshaft sensor as claimed in claim 9.

* * * * *